(12) United States Patent
Liu

(10) Patent No.: US 10,707,936 B2
(45) Date of Patent: Jul. 7, 2020

(54) CHANNEL STATE INFORMATION CSI MEASUREMENT AND FEEDBACK METHOD AND APPARATUS

(71) Applicant: Huawei Technologies Co., Ltd., Shenzhen, Guangdong (CN)

(72) Inventor: Kunpeng Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/972,976

(22) Filed: May 7, 2018

(65) Prior Publication Data
US 2018/0254817 A1 Sep. 6, 2018

Related U.S. Application Data

(63) Continuation of application No. PCT/CN2015/094067, filed on Nov. 6, 2015.

(51) Int. Cl.
*H04B 7/06* (2006.01)
*H04L 5/00* (2006.01)
*H04B 7/0456* (2017.01)

(52) U.S. Cl.
CPC .......... *H04B 7/0626* (2013.01); *H04L 5/006* (2013.01); *H04L 5/0048* (2013.01); *H04L 5/0057* (2013.01); *H04B 7/0478* (2013.01)

(58) Field of Classification Search
CPC .. H04B 7/0413; H04B 7/0478; H04B 7/0634; H04W 24/10; H04W 72/04
See application file for complete search history.

(56) References Cited

U.S. PATENT DOCUMENTS

| 2011/0299625 A1* | 12/2011 | Hooli ................... H04J 13/0074 13/74 |
| 2011/0319027 A1* | 12/2011 | Sayana ................ H04B 7/0632 455/67.11 |
| 2013/0301432 A1 | 11/2013 | Hammarwall et al. |

(Continued)

FOREIGN PATENT DOCUMENTS

| CN | 102111246 A | 6/2011 |
| CN | 104038319 A | 9/2014 |

(Continued)

*Primary Examiner* — Mansour Oveissi
(74) *Attorney, Agent, or Firm* — Maier & Maier, PLLC

(57) ABSTRACT

A channel state information (CSI) feedback method is provided. A receive end receives CSI process configuration information. The CSI process configuration information includes at least one CSI process, and a first CSI process in the at least one CSI process is associated with K reference signal resources and M interference measurement resources. For the first CSI process, the receive end obtains a target reference signal resource based on the K reference signal resources, obtains a target interference measurement resource based on the M interference measurement resources, and obtains CSI based on the target reference signal resource and the target interference measurement resource. The receive end sends the CSI. The CSI includes a target index, and the target index is used to represent the target reference signal resource and/or the target interference measurement resource. In this way, CSI feedback flexibility is improved.

10 Claims, 3 Drawing Sheets

(56) References Cited

U.S. PATENT DOCUMENTS

| | | | |
|---|---|---|---|
| 2013/0301448 A1* | 11/2013 | Sayana | H04W 24/10 370/252 |
| 2013/0315337 A1 | 11/2013 | Dai et al. | |
| 2013/0322376 A1 | 12/2013 | Marinier et al. | |
| 2015/0215018 A1* | 7/2015 | Xiong | H04W 24/10 370/329 |
| 2015/0341814 A1* | 11/2015 | Yu | H04B 7/04 370/252 |
| 2015/0358060 A1 | 12/2015 | Park et al. | |
| 2016/0006487 A1 | 1/2016 | Ding et al. | |

FOREIGN PATENT DOCUMENTS

| | | |
|---|---|---|
| CN | 104272606 A | 1/2015 |
| CN | 104350688 A | 2/2015 |
| CN | 104584450 A | 4/2015 |
| CN | 105075321 A | 11/2015 |
| WO | 2014069941 A1 | 5/2014 |

* cited by examiner (1) CHANNEL STATE INFORMATION CSI MEASUREMENT AND FEEDBACK METHOD AND APPARATUS

CROSS-REFERENCE TO RELATED APPLICATIONS

This application is a continuation of International Application No. PCT/CN2015/094067, filed on Nov. 6, 2015, the disclosure of which is hereby incorporated by reference in its entirety.

TECHNICAL FIELD

The present application relates to the field of communications technologies, and in particular, to a CSI (channel state information) measurement and feedback method and an apparatus.

BACKGROUND

As wireless communications technologies develop, higher requirements are imposed on a system throughput and a system rate, and an MIMO (multiple-input multiple-output) technology emerges. In the MIMO technology, a spatial feature can be fully used to increase a system capacity without increasing transmit power and bandwidth. In addition, the MIMO technology plays an important role in increasing a peak rate and improving reliability of data transmission, expanding coverage, suppressing interference, and increasing the system capacity and the system throughput. As requirements on a rate and spectral efficiency constantly increase, enhancement and optimization of the MIMO technology are always an important direction for LTE system evolution.

A 1D antenna is used in a conventional 2D MIMO technology. To be specific, the antenna is placed in only a horizontal direction. As shown in FIG. 1A and FIG. 1B, a fixed downtilt is used for all terminals, and a beam direction can be adjusted in only the horizontal direction. As technologies develop, a 2D antenna is introduced, that is, a 3D MIMO technology. As shown in FIG. 1C, FIG. 1D, FIG. 1E, and FIG. 1F, a beam direction of the 2D antenna can be adjusted in both the horizontal direction and a vertical direction, and beam direction adjustment is freer.

In the 3D MIMO technology, an expression form of W1 is shown in Formula 1.

$$W_1 = \begin{bmatrix} \tilde{X}_1 \otimes \tilde{X}_2 & 0 \\ 0 & \tilde{X}_1 \otimes \tilde{X}_2 \end{bmatrix}, \quad \text{(Formula 1)}$$

where $\tilde{X}_1$ and $\tilde{X}_2$ are vectors in different dimensions or vector combinations. In this case, when feeding back a W1-related PMI to a base station, a terminal needs to feed back PMIs (Precoding Matrix Indicators, precoding matrix indicator) in two dimensions. However, currently, there is no CSI measurement and feedback method specific to the 3D MIMO technology.

SUMMARY

Embodiments of the present disclosure provide a CSI feedback method and an apparatus, so as to improve CSI feedback flexibility.

A channel state information CSI feedback method includes:
  receiving, by a receive end, CSI process configuration information, where the CSI process configuration information includes at least one CSI process, and a first CSI process in the at least one CSI process is associated with K reference signal resources and M interference measurement resources;
  for the first CSI process, obtaining, by the receive end, a target reference signal resource based on the K reference signal resources, and obtaining a target interference measurement resource based on the M interference measurement resources;
  obtaining CSI based on the target reference signal resource and the target interference measurement resource; and
  sending, by the receive end, the CSI, where the CSI includes a target index, and the target index is used to represent the target reference signal resource and/or the target interference measurement resource.

A channel state information CSI feedback method includes:
  sending, by a transmit end, CSI process configuration information, where the CSI process configuration information includes at least one CSI process, and a first CSI process in the at least one CSI process is associated with K reference signal resources and M interference measurement resources; and
  receiving, by the transmit end, the CSI, where the CSI includes a target index, the target index is used to represent the target reference signal resource and/or the target interference measurement resource, the CSI is obtained based on the target reference signal resource and the target interference measurement resource, and the target interference measurement resource is obtained based on the M interference measurement resources and the target reference signal resource obtained from the K reference signal resources.

A channel state information CSI feedback method includes:
  obtaining, by a transmit end, resource configuration information of a first reference signal, and obtaining the first reference signal based on the resource configuration information, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners;
  performing, by the transmit end, channel measurement based on the first reference signal, to determine channel state information CSI; and
  sending, by the transmit end, the CSI.

A channel state information CSI feedback method includes:
  sending, by a receive end, resource configuration information of a first reference signal, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners; and receiving, by the receive end, the CSI.

The embodiments of the present disclosure provide the CSI feedback method. The receive end receives the CSI process configuration information. The CSI process configuration information includes the at least one CSI process, and the first CSI process in the at least one CSI process is associated with the K reference signal resources and the M interference measurement resources. For the first CSI process, the receive end obtains the target reference signal resource based on the K reference signal resources, obtains the target interference measurement resource based on the M interference measurement resources, and obtains the CSI based on the target reference signal resource and the target interference measurement resource. The receive end sends the CSI. The CSI includes the target index, and the target index is used to represent the target reference signal resource and/or the target interference measurement resource. In this way, CSI feedback flexibility is improved.

DETAILED DESCRIPTION

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
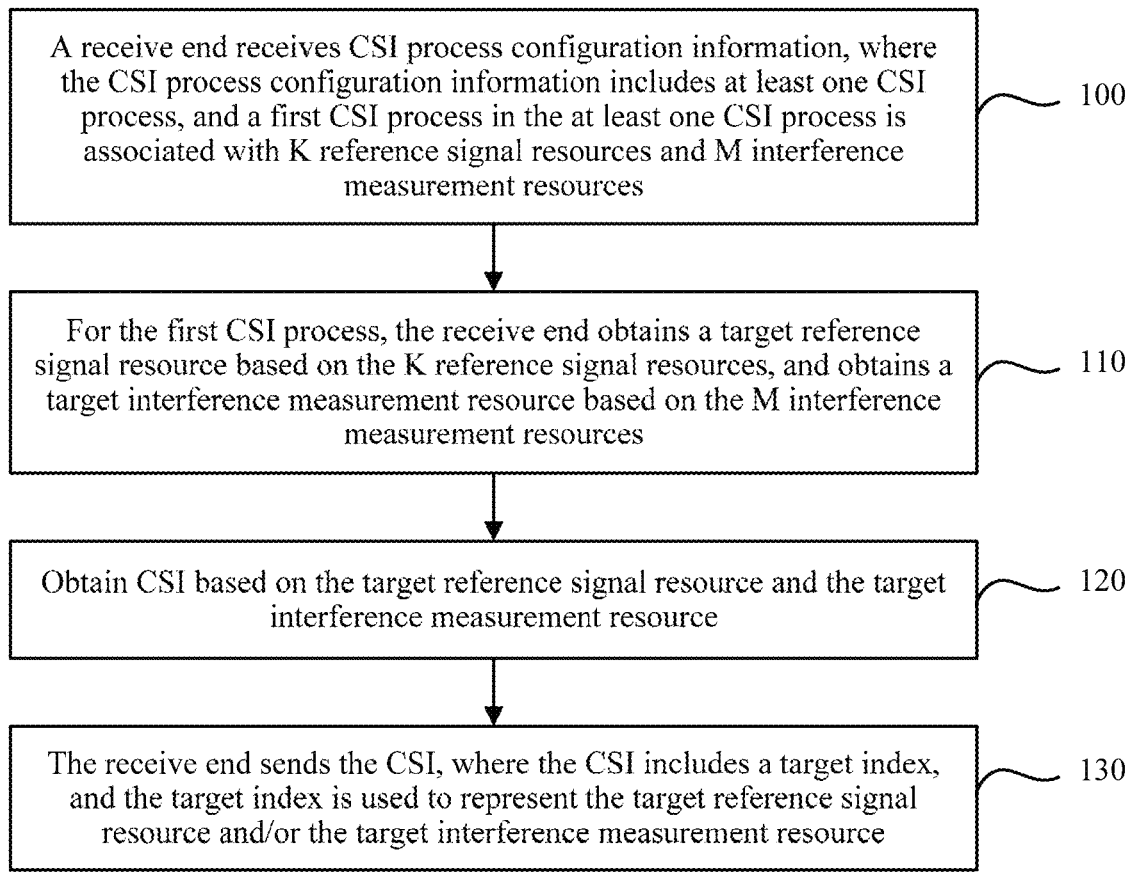
FIG. 1 is a flowchart of CSI feedback according to an embodiment of the present disclosure.

Referring to FIG. 1, an embodiment of the present disclosure provides a channel state information (CSI) feedback method. A specific process is as follows:

Step 100: A receive end receives CSI process configuration information, where the CSI process configuration information includes at least one CSI process, and a first CSI process in the at least one CSI process is associated with K reference signal resources and M interference measurement resources.

Step 110: For the first CSI process, the receive end obtains a target reference signal resource based on the K reference signal resources, and obtains a target interference measurement resource based on the M interference measurement resources.

Step 120: Obtain CSI based on the target reference signal resource and the target interference measurement resource.

Step 130: The receive end sends the CSI, where the CSI includes a target index, and the target index is used to represent the target reference signal resource and/or the target interference measurement resource.

In this embodiment, a specific one in a terminal M may be indicated by a base station.

Optionally, the obtaining a target reference signal resource based on the K reference signal resources is specifically:

selecting the target reference signal resource from the K reference signal resources.

The obtaining a target interference measurement resource based on the M interference measurement resources includes:

selecting the target interference measurement resource from the M interference measurement resources, or using an average of the M interference measurement resources as the target interference measurement resource.

Optionally, the target index is an index of the target reference signal resource and/or an index of the target interference measurement resource; or the target index is a joint index generated based on an index of the target reference signal resource and an index of the target interference measurement resource.

Before the obtaining CSI based on the target reference signal resource and the target interference measurement resource, the method further includes:

receiving a measurement manner indication sent by a base station, and obtaining, based on the measurement manner indication, a manner of obtaining the CSI based on the target reference signal resource and the target interference measurement resource.

Optionally, for a first reference signal resource in the K reference signal resources, if a quantity of ports corresponding to the first reference signal resource is greater than 8, an RE location of the first reference signal resource is indicated by using K second reference signal resources, where a total quantity of ports corresponding to the K second reference signal resources is greater than or equal to 8.

Optionally, K is related to a length of an orthogonal spreading code used for the first reference signal resource and/or a spreading manner of the first reference signal resource.

Optionally, if the length of the orthogonal spreading code used for the first reference signal resource is 2, K is greater than or equal to 1, and the RE location of the first reference signal resource is indicated by using a second reference signal resource obtained by combining the K second reference signal resources; or if the length of the orthogonal spreading code used for the first reference signal resource is 4, K is equal to 1.

Figure 2:
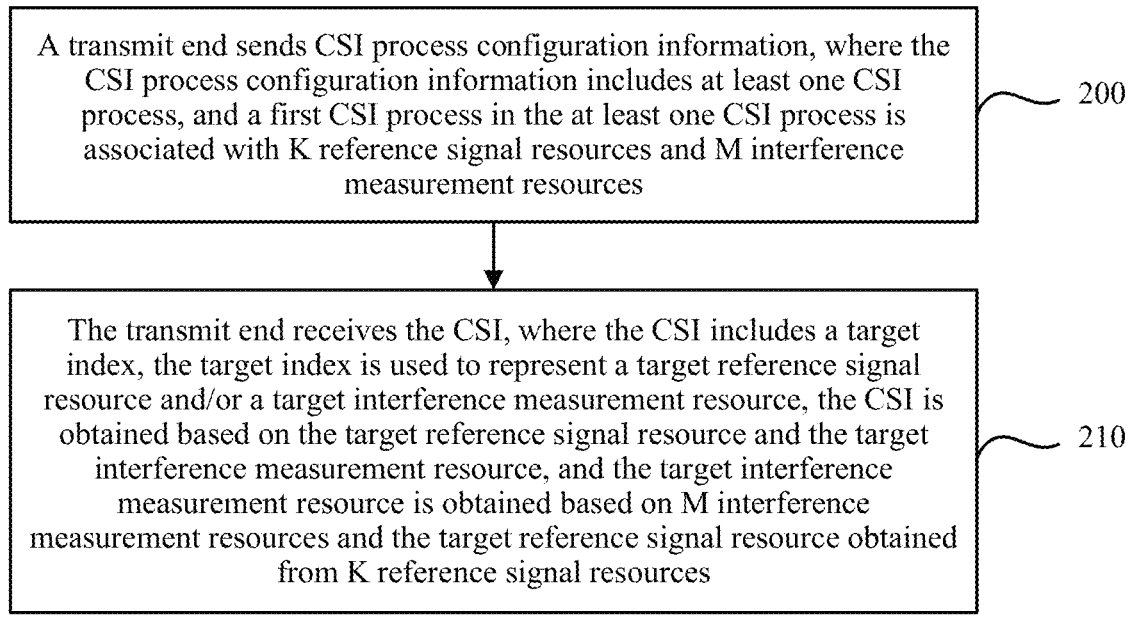
FIG. 2 is a flowchart of another CSI feedback according to an embodiment of the present disclosure.

Referring to FIG. 2, an embodiment of the present disclosure provides another channel state information (CSI) feedback method. A specific process is as follows:

Step 200: A transmit end sends CSI process configuration information, where the CSI process configuration information includes at least one CSI process, and a first CSI process in the at least one CSI process is associated with K reference signal resources and M interference measurement resources.

Step 210: The transmit end receives the CSI, where the CSI includes a target index, the target index is used to represent the target reference signal resource and/or the target interference measurement resource, the CSI is obtained based on the target reference signal resource and the target interference measurement resource, and the target interference measurement resource is obtained based on the M interference measurement resources and the target reference signal resource obtained from the K reference signal resources.

Optionally, the target index is an index of the target reference signal resource and/or an index of the target interference measurement resource; or the target index is a joint index generated based on an index of the target reference signal resource and an index of the target interference measurement resource.

Before the receiving, by the transmit end, the CSI, the method further includes:

sending, by the transmit end, a measurement manner indication, so that a receive end obtains, based on the measurement manner indication, a manner of obtaining the CSI based on the target reference signal resource and the target interference measurement resource.

Optionally, for a first reference signal resource in the K reference signal resources, if a quantity of ports corresponding to the first reference signal resource is greater than 8, an RE location of the first reference signal resource is indicated by using K second reference signal resources, where a total quantity of ports corresponding to the K second reference signal resources is greater than or equal to 8.

Optionally, K is related to a length of an orthogonal spreading code used for the first reference signal resource and/or a spreading manner of the first reference signal resource.

Optionally, if the length of the orthogonal spreading code used for the first reference signal resource is 2, K is greater than or equal to 1, and the RE location of the first reference signal resource is indicated by using a second reference signal resource obtained by combining the K second reference signal resources; or if the length of the orthogonal spreading code used for the first reference signal resource is 4, K is equal to 1.

Figure 3:
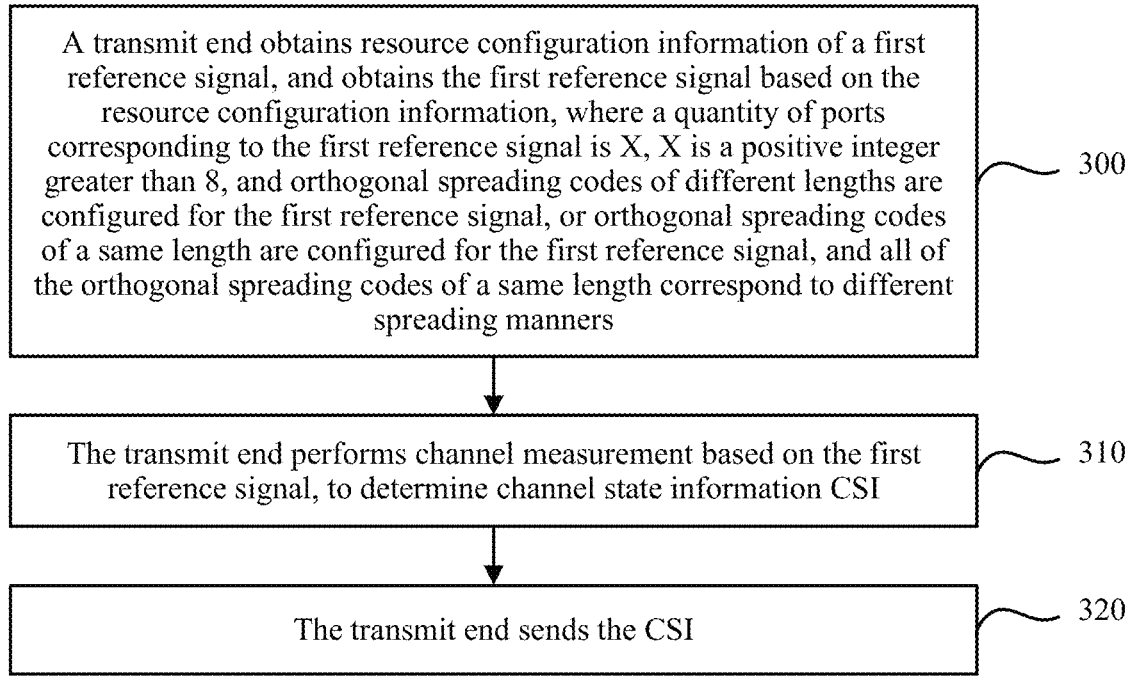
FIG. 3 is a flowchart of another CSI feedback according to an embodiment of the present disclosure.

Referring to FIG. 3, an embodiment of the present disclosure provides another channel state information (CSI) feedback method. A specific process is as follows:

Step 300: A transmit end obtains resource configuration information of a first reference signal, and obtains the first reference signal based on the resource configuration information, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

Step 310: The transmit end performs channel measurement based on the first reference signal, to determine channel state information CSI.

Step 320: The transmit end sends the CSI.

Optionally, a resource location of the first reference signal is indicated by using resource locations of K second reference signals, a quantity of ports corresponding to each of the K second reference signals is $N_k$, $N_k$ is a positive integer greater than or equal to 1 and less than or equal to 8, and X is equal to a product of K and $N_k$.

Optionally, when a length of the orthogonal spreading code is 4, a configuration set corresponding to the second reference signal is a first set; or when a length of the orthogonal spreading code is 2, a configuration set corresponding to the second reference signal is a second set. The second set includes the first set.

Optionally, when a length of the orthogonal spreading code is 2, K is greater than 1, and a resource of the first reference signal is a combination of resources of the K second reference signals. For a first CSI-RS whose spreading code length is 4, K=1, and an RE location of the first CSI-RS is not indicated by combining resources of at least two second CSI-RSs.

Optionally, when a length of the orthogonal spreading code is 2, a quantity of adjacent orthogonal frequency division multiplexing OFDM symbols occupied by the first reference signal is less than or equal to 2; or when the first reference signal occupies four adjacent OFDM symbols, resource elements occupied by a spreading code are on a same subcarrier, and the spreading code occupies no more than three of the four OFDM symbols.

Optionally, when the length of the orthogonal spreading code is 4, a sequence generation manner of the first reference signal is as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

Sequence symbols of a same port that are mapped on two adjacent subcarriers in a same OFDM symbol in a same PRB are the same.

Figure 4:
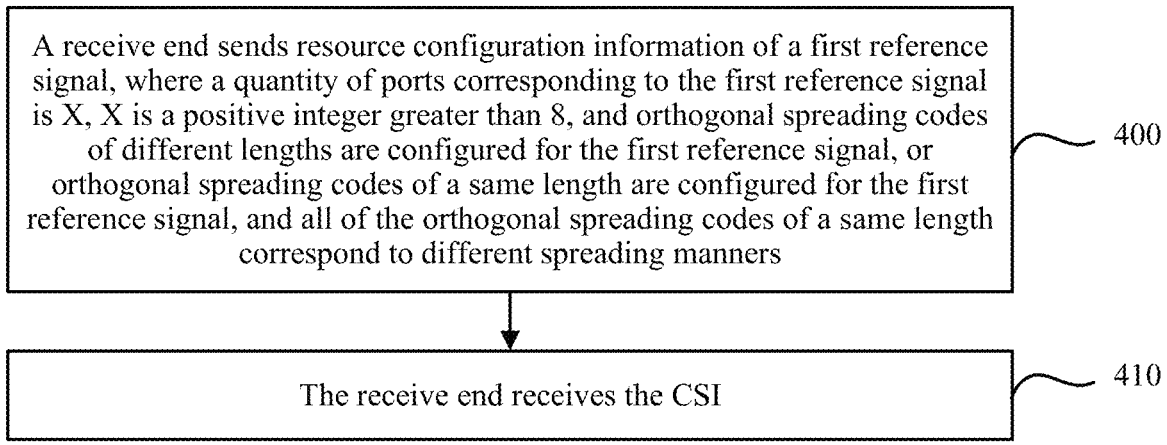
FIG. 4 is a flowchart of another CSI feedback according to an embodiment of the present disclosure.

Referring to FIG. 4, an embodiment of the present disclosure provides another channel state information CSI feedback method. A specific process is as follows:

Step 400: A receive end sends resource configuration information of a first reference signal, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

Step 410: The receive end receives the CSI.

Optionally, a resource location of the first reference signal is indicated by using resource locations of K second reference signals, a quantity of ports corresponding to each of the K second reference signals is $N_k$, $N_k$ is a positive integer greater than or equal to 1 and less than or equal to 8, and X is equal to a product of K and $N_k$.

Optionally, when a length of the orthogonal spreading code is 4, a configuration set corresponding to the second reference signal is a first set; or when a length of the orthogonal spreading code is 2, a configuration set corresponding to the second reference signal is a second set. The second set includes the first set.

Optionally, when a length of the orthogonal spreading code is 2, K is greater than 1, and a resource of the first reference signal is a combination of resources of the K second reference signals. For a first CSI-RS whose spreading code length is 4, K=1, and an RE location of the first CSI-RS is not indicated by combining resources of at least two second CSI-RSs.

Optionally, when a length of the orthogonal spreading code is 2, a quantity of adjacent orthogonal frequency division multiplexing OFDM symbols occupied by the first reference signal is less than or equal to 2; or when the first reference signal occupies four adjacent OFDM symbols, resource elements occupied by a spreading code are on a same subcarrier, and the spreading code occupies no more than three of the four OFDM symbols.

Optionally, when the length of the orthogonal spreading code is 4, a sequence generation manner of the first reference signal is as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m=0, 1, \ldots, N_{RB}^{max,DL} - 1$$

Sequence symbols of a same port that are mapped on two adjacent subcarriers in a same OFDM symbol in a same PRB are the same.

Figure 5:
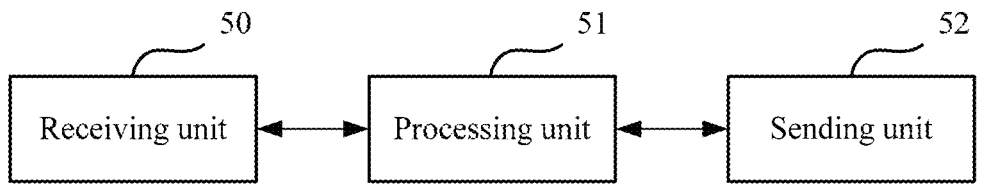
FIG. 5 is a schematic diagram of a receive end according to an embodiment of the present disclosure.

Referring to FIG. 5A, a receive end is further provided, including a receiving unit 50, a processing unit 51, and a sending unit 52.

The receiving unit 50 is configured to receive CSI process configuration information, where the CSI process configuration information includes at least one CSI process, and a first CSI process in the at least one CSI process is associated with K reference signal resources and M interference measurement resources.

The processing unit 51 is configured to: for the first CSI process, obtain a target reference signal resource based on the K reference signal resources, and obtain a target interference measurement resource based on the M interference measurement resources; and obtain CSI based on the target reference signal resource and the target interference measurement resource.

The sending unit 52 is configured to send the CSI, where the CSI includes a target index, and the target index is used to represent the target reference signal resource and/or the target interference measurement resource.

Optionally, when obtaining the target reference signal resource based on the K reference signal resources, the processing unit 51 is specifically configured to:

select the target reference signal resource from the K reference signal resources.

When obtaining the target interference measurement resource based on the M interference measurement resources, the processing unit 51 is specifically configured to:

select the target interference measurement resource from the M interference measurement resources, or use an average of the M interference measurement resources as the target interference measurement resource.

Optionally, the target index is an index of the target reference signal resource and/or an index of the target interference measurement resource; or the target index is a joint index generated based on an index of the target reference signal resource and an index of the target interference measurement resource.

The receiving unit 50 is further configured to:

receive a measurement manner indication sent by a base station, and obtain, based on the measurement manner indication, a manner of obtaining the CSI based on the target reference signal resource and the target interference measurement resource.

Optionally, for a first reference signal resource in the K reference signal resources, if a quantity of ports corresponding to the first reference signal resource is greater than 8, an RE location of the first reference signal resource is indicated by using K second reference signal resources, where a total quantity of ports corresponding to the K second reference signal resources is greater than or equal to 8.

Optionally, K is related to a length of an orthogonal spreading code used for the first reference signal resource and/or a spreading manner of the first reference signal resource.

Optionally, if the length of the orthogonal spreading code used for the first reference signal resource is 2, K is greater than or equal to 1, and the RE location of the first reference signal resource is indicated by using a second reference signal resource obtained by combining the K second reference signal resources; or if the length of the orthogonal spreading code used for the first reference signal resource is 4, K is equal to 1.

Referring to FIG. 5B, a receive end is further provided, including a receiver 500, a processor 510, and a transmitter 520.

The receiver 500 is configured to receive CSI process configuration information, where the CSI process configuration information includes at least one CSI process, and a first CSI process in the at least one CSI process is associated with K reference signal resources and M interference measurement resources.

The processor 510 is configured to: for the first CSI process, obtain a target reference signal resource based on the K reference signal resources, and obtain a target interference measurement resource based on the M interference measurement resources; and obtain CSI based on the target reference signal resource and the target interference measurement resource.

The transmitter 520 is configured to send the CSI, where the CSI includes a target index, and the target index is used to represent the target reference signal resource and/or the target interference measurement resource.

It should be noted that the receiver 500 may further perform another operation performed by the receiving unit 50, the processor 510 may further perform another operation performed by the processing unit 51, and the transmitter 520 may further perform another operation performed by the sending unit 52.

Referring to FIG. 6A, a transmit end is further provided, including a sending unit 60 and a receiving unit 61.

The sending unit 60 is configured to send CSI process configuration information, where the CSI process configuration information includes at least one CSI process, and a first CSI process in the at least one CSI process is associated with K reference signal resources and M interference measurement resources.

The receiving unit 61 is configured to receive the CSI, where the CSI includes a target index, the target index is used to represent the target reference signal resource and/or the target interference measurement resource, the CSI is obtained based on the target reference signal resource and the target interference measurement resource, and the target interference measurement resource is obtained based on the M interference measurement resources and the target reference signal resource obtained from the K reference signal resources.

Optionally, the target index is an index of the target reference signal resource and/or an index of the target interference measurement resource; or the target index is a joint index generated based on an index of the target reference signal resource and an index of the target interference measurement resource.

The sending unit 60 is further configured to send a measurement manner indication, so that a receive end obtains, based on the measurement manner indication, a manner of obtaining the CSI based on the target reference signal resource and the target interference measurement resource.

Optionally, for a first reference signal resource in the K reference signal resources, if a quantity of ports corresponding to the first reference signal resource is greater than 8, an RE location of the first reference signal resource is indicated by using K second reference signal resources, where a total quantity of ports corresponding to the K second reference signal resources is greater than or equal to 8.

Optionally, K is related to a length of an orthogonal spreading code used for the first reference signal resource and/or a spreading manner of the first reference signal resource.

Optionally, if the length of the orthogonal spreading code used for the first reference signal resource is 2, K is greater than or equal to 1, and the RE location of the first reference signal resource is indicated by using a second reference signal resource obtained by combining the K second reference signal resources; or if the length of the orthogonal spreading code used for the first reference signal resource is 4, K is equal to 1.

Referring to FIG. 6B, a transmit end is further provided, including a transmitter 600 and a receiver 610.

The transmitter 600 is configured to send CSI process configuration information, where the CSI process configuration information includes at least one CSI process, and a first CSI process in the at least one CSI process is associated with K reference signal resources and M interference measurement resources.

The receiver 610 is configured to receive the CSI, where the CSI includes a target index, the target index is used to represent the target reference signal resource and/or the target interference measurement resource, the CSI is obtained based on the target reference signal resource and the target interference measurement resource, and the target interference measurement resource is obtained based on the M interference measurement resources and the target reference signal resource obtained from the K reference signal resources.

It should be noted that the transmitter 600 may further perform another operation performed by the sending unit 60, and the receiver 610 may further perform another operation performed by the receiving unit 61.

Referring to FIG. 7A, a transmit end is further provided, including a receiving unit 70, a processing unit 71, and a sending unit 72.

The receiving unit 70 is configured to: obtain resource configuration information of a first reference signal, and obtain the first reference signal based on the resource configuration information, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

The processing unit 71 is configured to perform channel measurement based on the first reference signal, to determine channel state information CSI.

The sending unit 72 is configured to send the CSI.

Optionally, a resource location of the first reference signal is indicated by using resource locations of K second reference signals, a quantity of ports corresponding to each of the K second reference signals is $N_k$, $N_k$ is a positive integer greater than or equal to 1 and less than or equal to 8, and X is equal to a product of K and $N_k$.

Optionally, when a length of the orthogonal spreading code is 4, a configuration set corresponding to the second reference signal is a first set; or when a length of the orthogonal spreading code is 2, a configuration set corresponding to the second reference signal is a second set. The second set includes the first set.

Optionally, when a length of the orthogonal spreading code is 2, K is greater than 1, and a resource of the first reference signal is a combination of resources of the K second reference signals. For a first CSI-RS whose spreading code length is 4, K=1, and an RE location of the first CSI-RS is not indicated by combining resources of at least two second CSI-RSs.

Optionally, when a length of the orthogonal spreading code is 2, a quantity of adjacent orthogonal frequency division multiplexing OFDM symbols occupied by the first reference signal is less than or equal to 2; or when the first reference signal occupies four adjacent OFDM symbols, resource elements occupied by a spreading code are on a same subcarrier, and the spreading code occupies no more than three of the four OFDM symbols.

Optionally, when the length of the orthogonal spreading code is 4, a sequence generation manner of the first reference signal is as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

Sequence symbols of a same port that are mapped on two adjacent subcarriers in a same OFDM symbol in a same PRB are the same.

Referring to FIG. 7B, a transmit end is further provided, including a receiver 700, a processor 710, and a transmitter 720.

The receiver 700 is configured to: obtain resource configuration information of a first reference signal, and obtain the first reference signal based on the resource configuration information, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

The processor 710 is configured to perform channel measurement based on the first reference signal, to determine channel state information CSI.

The transmitter 720 is configured to send the CSI.

Referring to FIG. 8A, a receive end is further provided, including a sending unit 80 and a receiving unit 81. The sending unit 80 is configured to send resource configuration information of a first reference signal, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

The receiving unit 81 is configured to receive the CSI.

Optionally, a resource location of the first reference signal is indicated by using resource locations of K second reference signals, a quantity of ports corresponding to each of the K second reference signals is $N_k$, $N_k$ is a positive integer greater than or equal to 1 and less than or equal to 8, and X is equal to a product of K and $N_k$.

Optionally, when a length of the orthogonal spreading code is 4, a configuration set corresponding to the second reference signal is a first set; or when a length of the orthogonal spreading code is 2, a configuration set corresponding to the second reference signal is a second set. The second set includes the first set.

Optionally, when a length of the orthogonal spreading code is 2, K is greater than 1, and a resource of the first reference signal is a combination of resources of the K second reference signals. For a first CSI-RS whose spreading code length is 4, K=1, and an RE location of the first CSI-RS is not indicated by combining resources of at least two second CSI-RSs.

Optionally, when a length of the orthogonal spreading code is 2, a quantity of adjacent orthogonal frequency division multiplexing OFDM symbols occupied by the first reference signal is less than or equal to 2; or when the first reference signal occupies four adjacent OFDM symbols, resource elements occupied by a spreading code are on a same subcarrier, and the spreading code occupies no more than three of the four OFDM symbols.

Optionally, when the length of the orthogonal spreading code is 4, a sequence generation manner of the first reference signal is as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

Sequence symbols of a same port that are mapped on two adjacent subcarriers in a same OFDM symbol in a same PRB are the same.

Referring to FIG. 8B, a receive end is further provided, including a transmitter 800 and a receiver 810.

The transmitter 800 is configured to send resource configuration information of a first reference signal, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

The receiver 810 is configured to receive the CSI.

As communications technologies develop, a quantity of antenna ports increases, and scenarios appear that a quantity of ports corresponding to a reference signal may be greater than 8.

Referring to FIG. 3, in an embodiment of the present disclosure, a CSI sending method is provided. A procedure is as follows:

Step 300: A terminal device obtains resource configuration information of a first reference signal, and obtains the first reference signal based on the resource configuration information, where a quantity of ports corresponding to the first reference signal is X, X is a positive integer greater than 8, and orthogonal spreading codes of different lengths are configured for the first reference signal, or orthogonal spreading codes of a same length are configured for the first reference signal, and all of the orthogonal spreading codes of a same length correspond to different spreading manners.

Step 310: The terminal device performs channel measurement based on the first reference signal, to determine channel state information CSI.

Step 320: The terminal device sends the CSI.

In this embodiment of the present disclosure, optionally, a resource location of the first reference signal is indicated by using resource locations of K second reference signals, a quantity of ports corresponding to each of the K second reference signals is $N_k$, $N_k$ is a positive integer greater than or equal to 1 and less than or equal to 8, and X is equal to a product of K and $N_k$.

For example, when the quantity of ports corresponding to the first reference signal is 16, the resource location of the first reference signal may be indicated by using resource locations of two second reference signals. In this case, the quantity of ports corresponding to each second reference signal is 8. Alternatively, the resource location of the first reference signal may be indicated by using resource locations of four second reference signals. In this case, the quantity of ports corresponding to each second reference signal is 4. Alternatively, the resource location of the first reference signal may be indicated by using resource locations of eight second reference signals. In this case, the quantity of ports corresponding to each second reference signal is 2.

When the quantity of ports corresponding to the first reference signal is 16, the resource location of the first reference signal is indicated by using the resource locations of the two second reference signals, and the ports corresponding to each of the two second reference signals is 8, there are five configurations for the second reference signal in Table 1, and configurations for the two second reference signals in this example are two configurations in Table 1. For example, (k',l') is (9, 5) and (11, 2), or (k',l') is (9, 2) and (11, 2).

For another example, when the quantity of ports corresponding to the first reference signal is 32, the resource location of the first reference signal may be indicated by using resource locations of four second reference signals. In this case, the quantity of ports corresponding to each second reference signal is 8. Alternatively, the resource location of the first reference signal may be indicated by using resource locations of eight second reference signals. In this case, the quantity of ports corresponding to each second reference signal is 4. Alternatively, the resource location of the first reference signal may be indicated by using resource locations of 16 second reference signals. In this case, the quantity of ports corresponding to each second reference signal is 2.

Examples in which the quantity of ports corresponding to the first reference signal is 16 and 32 are used for description above. Certainly, in practical application, the quantity of ports corresponding to the first reference signal may be another value, and details are not described herein.

In this embodiment of the present disclosure, optionally, when a length of the orthogonal spreading code is 4, a configuration set corresponding to the second reference signal is a first set; or when a length of the orthogonal spreading code is 2, a configuration set corresponding to the second reference signal is a second set. The second set includes the first set.

For example, when the quantity of ports corresponding to the first reference signal is 16, the resource location of the first reference signal is indicated by using the resource locations of the two second reference signals, and the quantity of ports corresponding to each of the two second reference signals is 8, there are five configurations for the second reference signal in Table 1, and configurations for the two second reference signals in this example are two configurations in Table 1. For example, (k',l') is (9, 5) and (11, 2), or (k',l') is (9, 2) and (11, 2). When the length of the orthogonal spreading code is 2, there are 10 configurations corresponding to the second reference signal, that is, the second set includes the 10 configurations. Alternatively, when the length of the orthogonal spreading code is 4, the configuration set corresponding to the second reference signal is the first set, and the first set includes one or two of 10 configurations. It should be noted that locations of four resource elements that require spreading need to be close to each other as much as possible because spreading is limited when the length of the orthogonal spreading code is 4. For example, only a resource element represented by ▨ and a resource element represented by ▨ in FIG. 3B are selected, or only a resource element represented by ▨ is selected.

In this embodiment of the present disclosure, when a length of the orthogonal spreading code is 2, K is greater than 1, and a resource of the first reference signal is a combination of resources of the K second reference signals. For a first CSI-RS whose spreading code length is 4, K=1, and an RE location of the first CSI-RS is not indicated by combining resources of at least two second CSI-RSs.

In this embodiment of the present disclosure, when a length of the orthogonal spreading code is 2, a quantity of adjacent orthogonal frequency division multiplexing OFDM symbols occupied by the first reference signal is less than or equal to 2. In an embodiment shown in FIG. 3B, the first reference signal can only be a resource element represented by ▨. Alternatively, when the first reference signal occupies four adjacent OFDM symbols, resource elements occupied by a spreading code are on a same subcarrier, and the spreading code occupies no more than three of the four OFDM symbols.

In this embodiment of the present disclosure, when the length of the orthogonal spreading code is 4, a sequence generation manner of the first reference signal is as follows:

$$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, N_{RB}^{max,DL} - 1$$

Sequence symbols of a same port that are mapped on two adjacent subcarriers in a same OFDM symbol in a same PRB are the same.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, a person skilled in the art can make changes and modifications to these embodiments once they learn the basic inventive concept. Therefore, the following claims are intended to be construed as to cover the embodiments and all changes and modifications falling within the scope of the present disclosure.

Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A channel state information (CSI) feedback method, comprising:
  receiving, by a receive end, CSI process configuration information comprising information of at least one CSI process, wherein a first CSI process in the at least one CSI process is associated with K reference signal resources and M interference measurement resources;
  for the first CSI process, obtaining, by the receive end, a target reference signal resource based on the K reference signal resources, and obtaining a target interference measurement resource based on the M interference measurement resources;
  obtaining CSI based on the target reference signal resource and the target interference measurement resource; and
  sending, by the receive end, the CSI, wherein the CSI comprises a target index for representing the target reference signal resource and the target interference measurement resource, wherein the target index comprises a joint index generated based on an index of the target reference signal resource and an index of the target interference measurement resource,
  wherein for a first reference signal resource in the K reference signal resources, K is related to at least one of a length of an orthogonal spreading code used for the first reference signal resource or a spreading manner of the first reference signal resource.

2. The method according to claim 1, wherein:
obtaining a target reference signal resource based on the K reference signal resources comprises:
selecting the target reference signal resource from the K reference signal resources; and
obtaining a target interference measurement resource based on the M interference measurement resources comprises:
selecting the target interference measurement resource from the M interference measurement resources, or using an average of the M interference measurement resources as the target interference measurement resource.

3. The method according to claim 1, wherein before obtaining CSI based on the target reference signal resource and the target interference measurement resource, the method further comprises:
receiving a measurement manner indication sent by a base station, and obtaining, based on the measurement manner indication, a manner of obtaining the CSI based on the target reference signal resource and the target interference measurement resource.

4. The method according to claim 1, wherein for the first reference signal resource in the K reference signal resources, when a quantity of ports corresponding to the first reference signal resource is greater than 8, a resource element (RE) location of the first reference signal resource is indicated by using K second reference signal resources, and wherein a total quantity of ports corresponding to the K second reference signal resources is greater than or equal to 8.

5. The method according to claim 1, wherein:
when the length of the orthogonal spreading code used for the first reference signal resource is 2, K is greater than or equal to 1, and the RE location of the first reference signal resource is indicated by using a second reference signal resource obtained by combining the K second reference signal resources; or
when the length of the orthogonal spreading code used for the first reference signal resource is 4, K is equal to 1.

6. A receive end, comprising:
a receiver, configured to receive channel state information (CSI) process configuration information comprising information of at least one CSI process, and wherein a first CSI process in the at least one CSI process is associated with K reference signal resources and M interference measurement resources;
a processor, configured to: for the first CSI process, obtain a target reference signal resource based on the K reference signal resources, obtain a target interference measurement resource based on the M interference measurement resources, and obtain CSI based on the target reference signal resource and the target interference measurement resource; and
a transmitter, configured to send the CSI, wherein the CSI comprises a target index for representing the target reference signal resource and the target interference measurement resource, wherein the target index comprises a joint index generated based on an index of the target reference signal resource and an index of the target interference measurement resource,
wherein for a first reference signal resource in the K reference signal resources, K is related to at least one of a length of an orthogonal spreading code used for the first reference signal resource or a spreading manner of the first reference signal resource.

7. The receive end according to claim 6, wherein:
to obtain the target reference signal resource based on the K reference signal resources, the processor is configured to:
select the target reference signal resource from the K reference signal resources; and
to obtain the target interference measurement resource based on the M interference measurement resources, the processor is configured to:
select the target interference measurement resource from the M interference measurement resources, or use an average of the M interference measurement resources as the target interference measurement resource.

8. The receive end according to claim 6, wherein the receiver is further configured to:
receive a measurement manner indication sent by a base station, and obtain, based on the measurement manner indication, a manner of obtaining the CSI based on the target reference signal resource and the target interference measurement resource.

9. The receive end according to claim 6, wherein:
for the first reference signal resource in the K reference signal resources, when a quantity of ports corresponding to the first reference signal resource is greater than 8, a resource element (RE) location of the first reference signal resource is indicated by using K second reference signal resources, and wherein a total quantity of ports corresponding to the K second reference signal resources is greater than or equal to 8.

10. The receive end according to claim 6, wherein:
when the length of the orthogonal spreading code used for the first reference signal resource is 2, K is greater than or equal to 1, and the RE location of the first reference signal resource is indicated by using a second reference signal resource obtained by combining the K second reference signal resources; or
when the length of the orthogonal spreading code used for the first reference signal resource is 4, K is equal to 1.

* * * * *